United States Patent
Sharma et al.

(10) Patent No.: US 12,488,867 B2
(45) Date of Patent: Dec. 2, 2025

(54) SYSTEM FOR PREDICTION OF THE DRUG TARGET LANDSCAPE FOR THERAPEUTIC USE AND A METHOD THEREOF

(71) Applicant: Innoplexus AG, Eschborn (DE)

(72) Inventors: Om Prakash Sharma, Pune (IN); Ansh Gupta, Menhdawal (IN); Hari Kapa, Kanuru Krishna (IN); Sandhya V, Bengaluru (IN)

(73) Assignee: Innoplexus AG, Eschborn (DE)

( * ) Notice: Subject to any disclaimer, the term of this patent is extended or adjusted under 35 U.S.C. 154(b) by 609 days.

(21) Appl. No.: 17/980,741

(22) Filed: Nov. 4, 2022

(65) Prior Publication Data
US 2024/0153604 A1    May 9, 2024

(51) Int. Cl.
*G16H 20/10*    (2018.01)
*G06N 3/08*    (2023.01)
*G06N 5/022*    (2023.01)

(52) U.S. Cl.
CPC .............. *G16H 20/10* (2018.01); *G06N 3/08* (2013.01); *G06N 5/022* (2013.01)

(58) Field of Classification Search
CPC .......... G16H 20/10; G16H 70/40; G06N 3/08; G06N 5/022; G06N 3/045
See application file for complete search history.

(56) References Cited

U.S. PATENT DOCUMENTS

| | | | | |
|---|---|---|---|---|
| 12,159,227 | B2* | 12/2024 | Park | G16C 20/70 |
| 2020/0082916 | A1* | 3/2020 | Polykovskiy | G06N 3/045 |
| 2021/0398621 | A1* | 12/2021 | Stojevic | G06N 3/047 |
| 2022/0383992 | A1* | 12/2022 | Triendl | G06N 3/044 |
| 2023/0317202 | A1* | 10/2023 | Stojevic | G16B 15/30 |
| | | | | 703/12 |

FOREIGN PATENT DOCUMENTS

| | | |
|---|---|---|
| CN | 111640471 A | 9/2020 |
| CN | 113936735 A | 1/2022 |

* cited by examiner

*Primary Examiner* — Joseph P Hirl (57) ABSTRACT

There is disclosed an Artificial Intelligence (AI) assisted drug discovery system and a method for generating active and inactive targets for a given drug. The generated targets comprise the complete target landscape for the given drug. The system comprises a processor which is configured to train a multi-label deep learning neural network and a predictive model to generate and validate a prediction score, and further execute the trained multi-label deep learning neural network and the trained predictive model to identify targets associated with the given drug, and generate the active and inactive targets for the given drug molecule in response to the generated prediction score for each target associated with the given drug.

20 Claims, 2 Drawing Sheets

SYSTEM FOR PREDICTION OF THE DRUG TARGET LANDSCAPE FOR THERAPEUTIC USE AND A METHOD THEREOF

FIELD OF INVENTION

In general, the present invention relates to the field of drug targeting and its efficacy in therapeutic use. In particular, the present disclosure relates to a system and method for the prediction of the drug target landscape for therapeutic use.

BACKGROUND

Drug target interaction is a prominent research area in the field of drug discovery. Drug target interaction has witnessed an ascending growth in the past decade. Drug target interaction refers to the recognition of interactions between chemical compounds and the protein targets in the human body. Identifying the interactions between drugs and target proteins is a key step in drug discovery. This not only aids to understand the disease mechanism but also helps to identify unexpected therapeutic activity or adverse side effects of drugs. Hence, drug-target interaction prediction becomes an essential tool in the field of drug repurposing. The availability of heterogeneous biological data on known drug-target interactions enabled many researchers to develop various computational methods to decipher unknown drug-target interactions.

Exploration of the drug-target interactions by biomedical experiments requires a lot of human, financial, and material resources. To save time and cost to meet the needs of the present generation, machine learning methods have been introduced into the prediction of drug-target interactions. A large amount of available drug and target data in existing databases, the evolving and innovative computer technologies, and the inherent characteristics of various types of machine learning have made machine learning techniques the mainstream method for drug-target interaction prediction research.

The drug discovery and identification of the drug's interaction with various targets in the human body is infested with countless challenges and drawbacks. Typically, when a drug is developed, it is designed so that it interacts with a specific target of interest in order to achieve the desired therapeutic effect. However, it is quite common to later find that the developed drug also interacts with multiple other targets that were not intended during its development. This is interesting because if a drug can interact with multiple targets, then it may have more than one therapeutic effect. Therefore, this provides a clear motivation for discovering new interactions for existing drugs. On a day-to-day basis, an enormous amount of new compounds are synthesized and are evaluated for their clinical significance. Most of these molecules are abandoned for their poor performance against their respective targets. Identification of possible targets and evaluation of compounds against these targets will be useful for repurposing the drug against a particular target or a disease.

At present there are various solutions are present to identify the possible targets and evaluation of compounds against these targets. Some of the already available prominent tools are SwissTargetPrediction, Super-PRED, Similarity ensemble approach (SEA), TarFisDock, PharmMapper. The aforementioned tools are also infested with the drawbacks.

SwissTargetPrediction is a web-based tool, since 2014, used for performing ligand-based target prediction for any given bioactive small molecule. The SwissTargetPrediction tool calculates the similarity between the user's query compounds and those compiled in curated, cleansed collections of known actives in well-defined experimental binding assays. The quantification of similarity is 2-fold. In both cases, it consists in computing a pair-wise comparison of 1D vectors describing molecular structures: the 2D measure uses the Tanimoto index between path-based binary fingerprints (FP2), while the 3D measure is based on a Manhattan distance similarity quantity between Electroshape 5D (ES5D) float vectors. The latter mines five descriptors for each atom of 20 previously generated conformations (Cartesian coordinates, partial charge, and lipophilic contribution). For both 2D and 3D similarity measures, the principle is that two similar molecules are represented by analogous vectors, which exhibit a quantified similarity close to 1. The SwissTargetPrediction model was trained by fitting a multiple logistic regression on various size-related subsets of known actives in order to weight 2D and 3D similarity parameters in a Combined-Score. A Combined-Score higher than 0.5 predicts that the molecules are likely to share a common protein target. In reverse screening, the Combined-Score allows to calculate for any query molecule, assumed as bioactive, the probability to target a given protein. As 2D and 3D descriptions of molecules are complementary, this dual-scoring ligand-based reverse screening showed high performance in predicting macromolecular targets in various test sets.

The novelties primarily constitute the dataset used to construct the collection of known actives. This set relies on the bioactivity data of ChEMBL version 23.

The similarity ensemble approach (SEA) is a 2D ligand-based similarity ensemble method. Each target present in SEA is described by a set of known ligands of various sizes. An input ligand is then compared against all ligands of all target sets via Tanimoto so similarity of the ECFP4 fingerprints. For each target, the Tanimoto similarities are summed up and z-scores are calculated. Since the authors computed the distribution of z-scores obtained between random similarity ensembles, the z-scores of a screening ligand to each target can be used to calculate the expectation values (E-values). Those E-values, similar as in the BLAST algorithm, express the likelihood that the observed similarity happened due to coincidence. SEA uses bioactivity data derived from ChEMBL and is maintained by the University of California, San Francisco (UCSF).

In SuperPRED, for a given molecule, it predicts ATC class and targets. Predictions are done using logistic regression machine learning models, based on Morgan fingerprints of length 1024. Training data was filtered in multiple steps and the model performance was evaluated using 10-fold cross-validation. While predicting targets, two different scores are computed namely: "probability" and "model accuracy". The first score is the probability that the input structure binds with the specific target, as determined by the respective target machine learning model. Since the model performances vary between different targets, additionally the 10-fold cross-validation score of the respective logistic regression model was also computed.

The aforementioned conventional tools which are used to identify the possible targets and evaluation of compounds against the targets, and are focused on similarities between the targets. This poses a major problem for the aforementioned conventional tools which is, the dissimilar targets or off-targets, on which a drug could interact effectively, are skipped. This is primarily because the aforementioned conventional tools work based on the similarities between the various targets, and off-targets are skipped repetitively. These omissions of the off-targets, which could have an effective interaction with the drug, prevent the aforementioned conventional tools to predict a complete landscape of all the possible targets for drug interactions. Furthermore, the aforementioned conventional tools are incapable of measuring the magnitude of the interactions between the drug and the target.

Thus, the invention as disclosed in the present disclosure aims to solve the problem of providing a complete and detailed landscape of the targets for drug interactions. The invention as disclosed in the present disclosure further aims to solve the problem of providing a quantifiable measure of the magnitude of interactions between the drug and the target.

Therefore, in light of the foregoing discussion, there exists a need to overcome the aforementioned drawbacks so as to provide a system configured to identify similar proteins.

SUMMARY

An object of the present disclosure is to identify all the possible landscapes of the targets on which a drug can interact.

Another object of the present invention is to provide a quantifiable measure of the magnitude of interactions between the drug and the target.

Another object of the present invention is to identify whether a drug can be used as an active ingredient in the treatment, as a treatment entity, based on the drug and target interaction.

Another object of the present invention is to identify all the possible targets with which a given drug can interact.

Another object of the present invention is to repurpose the drug to be used on one or more targets, by identifying the interactions between the drug and targets.

Another object of the present invention is to identify at least one anti-target, based on the interactions between the drug and target.

Another object of the present invention is to predict the efficacy of a drug upon interaction with a given target, in providing the therapeutic effect.

In the first aspect, embodiments of the present disclosure provide a system for generating active and inactive targets for a given drug, wherein the generated active and inactive targets comprise the entire target landscape for the given drug, wherein the system comprises a processor communicably coupled to a memory, wherein the processor is configured to:
 receive the given drug as simplified molecular-input line-entry system (SMILES) notation strings;
 execute a pre-trained multi-label deep learning neural network to transform the SMILES notation strings into machine-readable embeddings in N-dimensional latent space;
 execute a pre-trained predictive model to process the machine-readable embeddings and generate a prediction score for each target; and
 generate the active and inactive targets for the given drug in response to the generated prediction score for each target.

Optionally, the processor is configured to train the multi-label deep learning neural network and the predictive model, wherein, for the training of the multi-label deep learning neural network and the predictive model, the processor is further configured to:
 receive a plurality of input dataset of drug molecules and associated targets thereof from at least one ontology database;
 convert the plurality of input dataset into a multidimensional matrix;
 enrich the multidimensional matrix by imputing at least one missing data in the multidimensional matrix;
 execute the multi-label deep learning neural network to transform the multidimensional matrix into machine-readable embeddings in N-dimensional latent space;
 execute the predictive model to process the machine-readable embeddings and generate a prediction score for each associated target in the multidimensional matrix;
 validate the prediction score generated for each associated target using an existing ontology to conclude the training of the predictive model.

Optionally, at least one ontology database is at least one of a private database or a public database.

Optionally, the processor is configured to convert the plurality of input dataset of drug molecules into simplified molecular-input line-entry system (SMILES) notation strings.

Optionally, the multidimensional matrix comprises n*m dimensions, wherein the n dimension in the multidimensional matrix is number of columns representing count of targets, and wherein the m dimension in the multidimensional matrix is number of rows representing count of drug molecule of the input dataset.

Optionally, the processor is further configured to impute the at least one missing data in the multidimensional matrix by employing at least one similarity technique.

Optionally, the processor is further configured to impute the at least one missing data in the multidimensional matrix by calculating Tanimoto similarity based on the existing ontology of the drug molecules and associated targets thereof present in the plurality of the input dataset.

Optionally, the processor is further configured to impute the at least one missing data as active for given target present in the plurality of input dataset if the calculated Tanimoto similarity is greater than a threshold Tanimoto similarity.

Optionally, the machine-readable embeddings in N-dimensional latent space comprises drug molecule embeddings as known variable X and targets embeddings as unknown variable $Y_N$, and wherein N represents number of targets.

Optionally, the multi-label deep learning neural network is a Bidirectional Encoder Representations from Transformers model.

Optionally, the processor is configured to classify the target as active target when the prediction score for the target is greater than a threshold prediction score.

Optionally, the processor is configured to classify the target as inactive target when the prediction score for the target is smaller than the threshold prediction score.

Optionally, the processor is further configured to execute the trained predictive model to identify at least one target similar to the targets classified as active targets.

Optionally, the processor is further configured execute the trained predictive model to identify at least one antitarget.

Optionally, the processor is further configured execute the trained predictive model to identify at least one active target with high intrinsic activity.

In the second aspect, embodiments of the present disclosure provide a method for generating active and inactive targets for a given drug, wherein the generated active and inactive targets comprise entire target landscape for the given drug, wherein the method comprises:

receiving the given drug as simplified molecular-input line-entry system (SMILES) notation strings;

executing a pre-trained multi-label deep learning neural network to transform the SMILES notation strings into machine-readable embeddings in N-dimensional latent space;

executing a pre-trained predictive model to process the machine-readable embeddings and generate a prediction score for each target; and generating the active and inactive targets for the given drug in response to the generated prediction score for each target.

Optionally, the method comprises training the multi-label deep learning neural network and the predictive model by:

receiving a plurality of input dataset of drug molecules and associated targets thereof from at least one ontology database;

converting the plurality of input dataset into a multidimensional matrix;

enriching the multidimensional matrix by imputing at least one missing data in the multidimensional matrix;

executing the multi-label deep learning neural network to transform the multidimensional matrix into machine-readable embeddings in N-dimensional latent space;

executing the predictive model to process the machine-readable embeddings and generate a prediction score for each associated target in the multidimensional matrix;

validating the prediction score generated for each associated target using an existing ontology to conclude the training of the predictive model.

Optionally, imputing of the at least one missing data in the multidimensional matrix is done by employing at least one similarity technique.

Optionally, the method comprises identifying at least one target similar to the targets classified as active targets.

Optionally, the method comprises identifying at least one antitarget.

Optionally, the method comprises identifying at least one active target with high intrinsic activity.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

A better understanding of the present invention may be obtained through the following examples which are set forth to illustrate but are not to be construed as limiting the present invention.

BRIEF DESCRIPTION OF DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated line, the non-underlined number is used to identify a general item to which the line is pointing.

DETAILED DESCRIPTION

The following detailed description illustrates embodiments of the present disclosure and ways in which they can be implemented. Although some modes of carrying out the present disclosure have been disclosed, those skilled in the art would recognise that other embodiments for carrying out or practising the present disclosure are also possible.

In the first aspect, embodiments of the present disclosure provide a system for generating active and inactive targets for a given drug, wherein the generated active and inactive targets comprise entire target landscape for the given drug, wherein the system comprises a processor communicably coupled to a memory, wherein the processor is configured to:

receive the given drug as simplified molecular-input line-entry system (SMILES) notation strings;

execute a pre-trained multi-label deep learning neural network to transform the SMILES notation strings into machine-readable embeddings in N-dimensional latent space;

execute a pre-trained predictive model to process the machine-readable embeddings and generate a prediction score for each target; and generate the active and inactive targets for the given drug in response to the generated prediction score for each target.

Optionally, the processor is configured to train the multi-label deep learning neural network and the predictive model, wherein, for the training of the multi-label deep learning neural network and the predictive model, the processor is further configured to:

receive a plurality of input dataset of drug molecules and associated targets thereof from at least one ontology database;

convert the plurality of input dataset into a multidimensional matrix;

enrich the multidimensional matrix by imputing at least one missing data in the multidimensional matrix;

execute the multi-label deep learning neural network to transform the multidimensional matrix into machine-readable embeddings in N-dimensional latent space;

execute the predictive model to process the machine-readable embeddings and generate a prediction score for each associated target in the multidimensional matrix;

validate the prediction score generated for each associated target using an existing ontology to conclude the training of the predictive model.

In the second aspect, embodiments of the present disclosure provide a method for generating active and inactive targets for a given drug, wherein the generated active and inactive targets comprise entire target landscape for the given drug, wherein the method comprises:

receiving the given drug as simplified molecular-input line-entry system (SMILES) notation strings;

executing a pre-trained multi-label deep learning neural network to transform the SMILES notation strings into machine-readable embeddings in N-dimensional latent space;

executing a pre-trained predictive model to process the machine-readable embeddings and generate a prediction score for each target; and generating the active and inactive targets for the given drug in response to the generated prediction score for each target.

Optionally, the method comprises training the multi-label deep learning neural network and the predictive model by:

receiving a plurality of input dataset of drug molecules and associated targets thereof from at least one ontology database;

converting the plurality of input dataset into a multidimensional matrix;

enriching the multidimensional matrix by imputing at least one missing data in the multidimensional matrix;

executing the multi-label deep learning neural network to transform the multidimensional matrix into machine-readable embeddings in N-dimensional latent space;

executing the predictive model to process the machine-readable embeddings and generate a prediction score for each associated target in the multidimensional matrix;

validating the prediction score generated for each associated target using an existing ontology to conclude the training of the predictive model.

The present disclosure provides the aforementioned system and a method for generating active and inactive targets for a given drug. The generated active and inactive targets comprise the entire target landscape for the given drug. The system comprises a processor which is communicably coupled to a memory. The processor is configured to receive the given drug as simplified molecular-input line-entry system (SMILES) notation strings, execute a pre-trained multi-label deep learning neural network to transform the SMILES notation strings into machine-readable embeddings in N-dimensional latent space, execute a pre-trained predictive model to process the machine-readable embeddings and generate a prediction score for each target; and generate the active and inactive targets for the given drug in response to the generated prediction score for each target.

Optionally, the processor is configured to train a multi-label deep learning neural network and a predictive model by being configured to receive a plurality of input dataset of drug molecules and associated targets from an ontology database and convert the plurality of input dataset into a multidimensional matrix. The multidimensional matrix is enriched by imputing at least one missing data in the multidimensional matrix and execute the multi-label deep learning neural network to transform the multidimensional matrix into the machine-readable embeddings in N-dimensional latent space. Furthermore, the predictive model is executed to process the machine-readable embeddings and generate a prediction score for the each associated target in the multidimensional matrix. The generated prediction score is then validated for each associated target using an existing ontology to conclude the training of the predictive model.

The trained multi-label deep learning neural network and the trained predictive model is then executed to, firstly, to identify targets by generating the prediction score and, secondly, to generate the active and inactive targets for the given drug molecule in response to the generated prediction score for each target.

The present disclosure provides the aforementioned system and the method provides a trained model which predicts the target(s) related to a drug molecule which was provided as an input to the aforementioned trained model. Furthermore, the aforementioned trained model also predicts and classify the active and inactive targets for the given drug, positively active targets and adversely or negatively active targets (anti-target), magnitude of the activity and/or interaction between the drug and the target, efficacy of the drug upon interaction with a given target in providing the therapeutic effect.

Advantageously, the aforementioned system and the method provide the all the possible landscapes of the targets in the is human body on which a given drug can interact, which includes but not limited to, providing the quantifiable measure of the magnitude of interactions between the drug and the target, identify and establish whether a drug can be used as an active ingredient in the treatment, as a treatment entity.

Furthermore, advantageously, the aforementioned system and the method also help in identifying all the possible targets in the human body with which a given drug can interact. The aforementioned system and the method also help in identifying the repurposing potential of the drug, and its possible usage on one or more targets, by identifying the interactions between the drug and the targets.

According to the present disclosure, in an embodiment, the system is configured to generate the active and the inactive targets for a given drug. The generated active and inactive targets comprise the entire target landscape for the given drug.

Throughout the present disclosure, the term "targets" as used herein, relates to the biochemical entity to which the drug binds and/or interacts in the human body to elicit its effects. There are a number of such entities targeted by the drug molecules. Particularly, the targets can be, proteins such as, but are not limited to receptors, enzymes, transporters, ion channels and/or genetic material. Furthermore, Throughout the present disclosure, the term "active targets" as used herein, relates to the targets with whom the given drug displays relatively high intrinsic interactions. Throughout the present disclosure, the term "inactive targets" as used herein, relates to the targets with whom the given drug displays relatively low or no intrinsic interactions.

Furthermore, the targets include, but are not limited to, receptors, ion channels, enzymes, and carrier molecules.

Furthermore, the aforementioned active and inactive targets comprise the complete target landscape for the given drug. Throughout the present disclosure, the term "target landscape" as used herein, relates to a detailed overview of the drug's interactions with the given targets. The target landscape includes, but are not limited to, potential of the drug and the target interactions, number of active and inactive targets for a given drug, magnitude of the drug and target interaction, the potential of a drug to be used as a treatment entity, potential of repurposing the given drug, and identifying all the possible anti-targets for a given target.

According to the present disclosure, in an embodiment the system comprises a processor communicably coupled to a memory, wherein the processor is communicably coupled to the memory via a data communication network.

Throughout the present disclosure, the term "processor" as used herein relates to at least one programmable or computational entity configured to acquire process, and/or respond to instructions to generate the active and inactive targets for the given drug. For example, the computational entity may include a memory, a network adapter, and the likes. In another example, the processor includes, but are not limited to, a microprocessor, a microcontroller, a complex instruction set computing (CISC) microprocessor, a reduced instruction set (RISC) microprocessor, a very long instruction word (VLIW) microprocessor, or any other type of processing circuit for executing data management and curation instructions. Furthermore, the processor includes one or more processing devices and various elements of a computer system associated with a processing device that may be shared by other processing devices. Additionally, in an embodiment, one or more processors, processing devices, processing devices, and elements are arranged in various architectures for responding to and processing the instructions that drive the system to generate the active and inactive targets for the given drug.

Throughout the present disclosure, the term "data communication network" refers to the individual networks or a collection thereof interconnected with each other and functioning as a single large network. Optionally, such a data communication network is implemented by way of a wired communication network, wireless communication network, or a combination thereof. It will be appreciated that a physical connection is established for implementing the wired communication network, whereas the wireless communication network is implemented using electromagnetic waves. Examples of such data communication networks include, but are not limited to, Local Area Networks (LANs), Wide Area Networks (WANs), Metropolitan Area Networks (MANs), Wireless LANs (WLANs), Wireless WANS (WWANs), Wireless MANS (WMANs), the Internet, second-generation (2G) telecommunication networks, third-generation (3G) telecommunication networks, fourth-generation(4G) telecommunication networks, fifth-generation (SG) telecommunication is networks and Worldwide Interoperability for Microwave Access (WiMAX) networks.

Optionally, the data communication network is implemented as a cellular network. It will be appreciated that the cellular network refers to a radio communication network, wherein the cellular network is distributed over land through cells. Specifically, each cell includes a fixed location transceiver, for example, a base station.

Throughout the present disclosure, the term "memory" as used herein, relates to an organized body of digital information regardless of the manner in which the data or the organized body thereof is represented. It refers to a collection of data that allows easy access, management, and updating of the data stored. Optionally, the memory may be hardware, software, firmware, and/or any combination thereof. For example, the organized body of digital information may be in a form of a table, a map, a grid, a packet, a datagram, a file, a document, a list or in any other form. Optionally, the data in the memory is organized into rows, columns, and tables. Additionally, optionally, the data in the memory is indexed (namely, labeled) for easy access thereto.

Optionally, the database arrangement comprises a set of processes (namely instructions) to create the plurality of databases and update thereto, query data from external sources, and process operational instructions provided thereto. Optionally, the memory is accessed electronically for, for example storing data, accessing data, and updating data, using a computing device. More optionally, such a computing device employs a database management system (DBMS) for creating and managing the database arrangement. Furthermore, optionally, the memory is an object oriented database, SQL database, relational database, distributed database, non-SQL database, and cloud database. The plurality of memories includes any data storage software and systems, such as, for example, a relational database like IBM DB2®, Google Cloud and Oracle 9®. Furthermore, the memory also includes a software program for creating and managing one or more databases. Optionally, the memory may be operable to support relational operations, regardless of whether it enforces strict adherence to a relational model, as understood by those of ordinary skill in the art. Additionally, the memory is populated by the elastic search libraries, elastic search databases, at least one relevant data element, topic-based web content and the likes. Optionally, the memory is populated by the operational data associated with the URIs, URLs, and/or URNs and their related information.

Optionally, according to an embodiment of the present disclosure, the processor is configured to train the multi-label deep learning neural network and the predictive model by being configured to, receive the plurality of input dataset of drug molecules and associated targets thereof from the at least one ontology database. The input data set from the ontology database includes, but are not limited to, information about the drugs and their interactions with the various targets. In addition, all the known relationships between drugs and protein targets (both active and inactive in terms of activity) are retrieved from the existing ontology databases. The aforementioned input data set retrieved from the ontology database is in a one-dimensional format.

Throughout the present disclosure, the term "multi-label deep learning neural network" as used herein, relates to an algorithm is that natively supports multi-label classification problems. Neural network models for multi-label classification tasks can be easily defined and evaluated using the Keras deep learning library. The classification is a predictive modeling problem that involves outputting a class label given some input. Furthermore, unlike normal classification tasks where class labels are mutually exclusive, multi-label classification requires specialized machine learning algorithms that support predicting multiple mutually non-exclusive classes or "labels". Furthermore, Neural network models can be configured to support multi-label classification, depending on the specifics of the classification task. Multi-label classification can be supported directly by neural networks simply by specifying the number of target labels there is in the problem as the number of nodes in the output layer.

Furthermore, if the dataset is small, neural network models are evaluated repeatedly on the same dataset and report the mean performance across the repeats. This is because of the stochastic nature of the learning algorithm. Additionally, the k-fold cross-validation is used instead of train/test splits of a dataset to get an unbiased estimate of model performance when making predictions on new data.

Furthermore, throughout the present disclosure, the term "deep learning neural network" as used herein, relates to a class of machine learning algorithms that uses artificial neural networks (ANNs) with many layers of nonlinear processing units for learning data representations. There are three basic layers in an ANN: the input layer, the hidden layer, and the output layer. Depending on the type of ANN, the nodes, also called neurons, in neighboring layers are either fully connected or partially connected. Input variables are taken by input nodes and the variables are transformed through hidden nodes, and in the end output values are calculated at output nodes. The output value Yi of the node i is calculated as shown in Eq. (1).

$$Y_i = g\left(\sum_j W_{ij} * a_j\right) \quad (1)$$

For example, a task that has three output labels (classes) will require a neural network output layer with three nodes in the output layer. Each node in the output layer uses sigmoid activation. This will predict a probability of class membership for the label, a value between 0 and 1. The model is compatible with the binary cross-entropy loss function. where aj refers to the input variables, Wij is the weight of input node j on node i, and function g is the activation function, which is normally a nonlinear function (e.g., sigmoid or Gaussian function) to transform the linear combination of the input signal from input nodes to an output value. The training of an ANN is done by iterative modification of the weight values in the network to optimize the errors between predicted and true value typically through the back-propagation methods.

Throughout the present disclosure, the term "predictive model" as used herein, relates to a commonly used statistical technique to predict future behavior. Predictive modeling solutions are a form of data-mining technology that works by analyzing historical and current data and generating a model to help predict future outcomes. In predictive modeling, data is collected, a statistical model is formulated, predictions are made, and the model is validated (or revised) as additional data becomes available. Predictive models analyze past is performance to assess how likely a user is to exhibit a specific behavior in the future. Predictive models are capable to perform calculations during live transactions. For example, to evaluate the risk or opportunity of a given customer or transaction to guide a decision. If health insurers could accurately predict secular trends (for example, utilization), premiums can be set appropriately, profit targets would be met with more consistency, and health insurers would be more competitive in the marketplace. Predictive model include, but are not limited to, Classification model, Forecast model, Clustering model, Outliers model, Time series model, Decision tree, Neural network, General linear model, Gradient boosted model, Prophet model.

Throughout the present disclosure, the term "ontology" as used herein, relates to the philosophical study of being, as well as related concepts such as existence, becoming, and reality. Ontology addresses questions of how entities are grouped into categories and which of these entities exist on the most fundamental level. Ontology aims to determine what the categories or highest kinds are and how they form a system of categories that encompasses classification of all entities. Commonly proposed categories include, but are not limited to, substances, properties, relations, states of affairs and events. These categories are characterized by fundamental ontological concepts, including particularity and universality, abstractness and concreteness, or possibility and necessity. The ontology database includes, but are not limited to, ChEMBL version 23, PubChem, PDB, and BindingDB.

Optionally, the at least one ontology database is at least one of a private database or a public database. Throughout the present disclosure, the term "public database" relates to the data that is is systematically collected, processed and stored by a public agency or public servant, Public data is accessible for reading and updating by all users who may access the library with the data. The public or private status of data may be altered via the/PROTECT command, and Private data may be read by all users who have access to the library with that data, but it may be modified only by the user who wrote the data initially. Public databases include, but are not limited to, websites, journals, published research papers, published articles, blogs, published lab experiments and published lab results.

Throughout the present disclosure, the term "private database" relates to the database which can be read by all users who have access to the library with that data, but it may be modified only by the user who wrote the data initially.

Optionally, the processor is configured to convert the plurality of input dataset of drug molecules into simplified molecular-input line-entry system (SMILES) notation strings. Throughout the present disclosure, the term "SMILES" relates to simplified molecular-input line-entry system which is a chemical notation that allows a user to represent a chemical structure in a way that can be used by the computer.

Convert the plurality of input dataset into a multidimensional matrix. The multidimensional matrix is of drug versus target. The one-dimensional input dataset of the drug-target relation is converted to the multidimensional matrix of dimensions N*M where "N" represents the number of columns which is the count of targets retrieved, and "M" represents the number of rows which is the count of drugs retrieved.

For example, the multidimensional matrix of dimensions N*M is as follows:

$$\begin{bmatrix} A_{11} & A_{12} & A_{13} & I_{14} \\ I_{21} & & A_{23} & I_{24} \\ A_{31} & I_{32} & I_{33} & A_{34} \\ A_{41} & I_{42} & A_{43} & \end{bmatrix} \begin{matrix} T1 \\ T2 \\ T3 \\ T4 \end{matrix} \quad (2)$$

$$D1 \quad D2 \quad D3 \quad D4$$

Here, in the aforementioned matrix, the "A" represents the activity of the drugs D1-D4 with the targets T1-T4, and "I" represents the inactivity of the drugs D1-D4 with the targets T1-T4. The missing values at row two column two, and row four column four represent the missing information in the ontology database with respect to the drug and target interactions.

Throughout the present disclosure, the term "multidimensional matrix" relates to an array with more than one level or dimension for the storage data for mathematic computations, image processing, and record management in a matrix form. The list of targets in the matrix columns are considered as the categorical values based on the active and inactive and labeled with binary values 0 or 1. A pre-trained BERT and/or GPT2 model is used to generate the machine-readable embedding format from the SMILES format of the drug which is given as input from the ontology database to the model.

Enrich the multidimensional matrix by imputing at least one missing data in the multidimensional matrix. The most of the is targets lack a definite active or inactive relationship with the existing drug molecules and have larger missing value (NA) counts. The missing data, at row two column two, and row four column four of the aforementioned matrix identified and provided through the process of the data imputation.

Optionally, the processor is further configured to impute the at least one missing data in the multidimensional matrix by employing at least one similarity technique. The similarity technique to impute the at least one missing data in the multidimensional matrix include, but are not limited to, Tanimoto similarity, Dice similarity, and Cosine coefficient. Optionally, at least one similarity technique is Tanimoto similarity. The calculation of the Tanimoto similarity is based on the existing ontology of the drug molecules and associated targets thereof present in the plurality of the input dataset.

The Tanimoto similarity is represented as follows:

$$S_{AB} = \frac{C}{A+B-C} \quad (3)$$

The Dice similarity is represented as follows:

$$S_{AB} = \frac{2C}{A+B} \quad (4)$$

The Cosine coefficient is represented as follows:

$$S_{AB} = \frac{C}{\sqrt{ab}} \quad (5)$$

The aforementioned similarity techniques, Tanimoto, Dice, and Cosine coefficients are similarity metrics (SAB), which evaluate how similar two molecules are to each other.

Optionally, the processor is further configured to impute the at least one missing data as active for given target present in the plurality of input dataset if the calculated Tanimoto similarity is greater is than a threshold Tanimoto similarity. For example, the drug target relation matrix is enhanced by, for a given target, all the drugs having the missing values were predicted to be Active or Inactive based on the tanimoto similarity technique with existing drug landscape. Particularly, If the tanimoto similarity>=95% with any of the active drugs for any given target, then the drug was treated as active for the given target, and If the tanimoto similarity <95% with any of the active drugs for any given target then the drug is treated as inactive for the given target. The aforementioned similarity techniques enrich the multidimensional matrix of the drug and target interactions.

Throughout the present disclosure, the term "tanimoto similarity technique" also referred to as the Tanimoto coefficient relates to a metric (or score) to measure the similarity of two sets of elements. Tanimoto coefficient can be simply defined as the ratio of the intersection of the two sets over the union of the two sets. Particularly, the Tanimoto coefficient of set A and set B can be defined as:

$$T = Nc/(Na+Nb-Nc), \text{ where:} \quad (6)$$

Na is the number of elements in set A;
Nb is the number of elements in set B;
Nc is the number of elements that are shared in A and B.

Execute the multi-label deep learning neural network to transform the multidimensional matrix into machine-readable embeddings in N-dimensional latent space. The list of targets in the matrix columns are considered as the categorical values based on the active and inactive and labeled with binary values 0 or 1. A pre-trained Multi-label model is used to generate the machine-readable embedding format from the SMILES format of the drug which is given as an input to the model. The drug embedding is considered as the known variable (X) and the targets are considered as unknown variables (y) and labeled a y1, y2, y3, . . . , yN where N is the number of targets.

Optionally, in a particular embodiment the multi-label deep learning neural network is a Bidirectional Encoder Representations from Transformers (BERT) model. Throughout the present disclosure, the term "Bidirectional Encoder Representations from Transformers (BERT)" relates to an open source machine learning framework for natural language processing. BERT enables the processor to understand the meaning of ambiguous language in the text by using surrounding text to establish context. The architecture of BERT is derived from transformers. Inside a BERT there are several stacked encoder cells, similar to in transformers. BERT is capable of reading all the input words simultaneously, and only uses the encoder part of the transformer. The SMILES format of the drug which is given as an input to the model are in natural language, which is not understandable by the system according to the present disclosure. The BERT model is is used to generate the machine-readable embedding format from the SMILES format.

Optionally, in a particular embodiment the multi-label deep learning neural network is a Generative Pre-trained Transformer 2 (GPT-2). Throughout the present disclosure, the term "Generative Pre-trained Transformer 2 (GPT-2)" relates to an open-source artificial intelligence created by OpenAI. The GPT-2 is capable of translating the text, answering the questions, summarizing the passages, and generating the text outputs, at high level of accuracy. The GPT-2 is capable of processing and converting the long passages containing the SMILES format into the machine-readable embedding. The GPT architecture implements a deep neural network, specifically a transformer model, which uses attention in place of previous recurrence- and convolution-based architectures. Attention mechanisms allow the model to selectively focus on segments of input text it predicts to be the most relevant.

The multidimensional matrix, after enrichment is further split into dataset in training ratio of at least 70, validation ration of at least 15, and testing ratio of at least 15.

Execute the predictive model to process the machine-readable embeddings and generate a prediction score for each associated target in the multidimensional matrix. The machine-readable embeddings generated above are processed by the predictive model to generate the predictive score for the given associated target in the multidimensional matrix. In the prediction of intended and non-intended targets for the input drug when a novel drug and/or an unseen drug is provided to the predictive model, the following steps are performed:

The SMILES format of the drug is converted to embedding format which is read by the predictive model.

The model draws the possibility for the novel drug between the active and inactive compounds for each target protein. Based on the prediction scores, the model predicts whether the given drug is active or inactive against a given target protein and assigns a list of other possible and similar target proteins against which the drug may have an activity.

Optionally, the processor is configured to classify the target as active target when the prediction score for the target is greater than a threshold prediction score. Optionally, the processor is configured to classify the target as inactive target when the prediction score for the target is smaller than the threshold prediction score. For example, a target is classified as the active target when the prediction score is at least above 50%, and the target is classified as the inactive target when the prediction score is below 50%.

Advantageously, the predictive model accurately predicts intended and non-intended targets for the input drug, and enables the processor to efficiently and accurately classify the target as an active target or an inactive target, based on the prediction score. In addition to this, the predictive model provides a quantifiable measure of the activity and inactivity of the drug, on the given target.

Validate the prediction score generated for each associated target using an existing ontology to conclude the training of the is predictive model. The prediction score generated by the aforementioned predictive model is validated by utilizing the existing ontology. This is to conclude the training of the predictive model. The validation of the prediction score is to check the accuracy of the prediction score and the predictive model.

Furthermore, the predictions are made on the test, and the model is validated based on the accuracy—accuracy for each instance is defined as the proportion of the predicted correct labels to the total number (predicted and actual) of labels for that instance. Overall accuracy is the average across all instances, and Hamming Loss—it reports how many times on average, the relevance of an example to a class label is incorrectly predicted. Therefore, hamming loss takes into account the prediction error (an incorrect label is predicted) and missing error (a relevant label not predicted), normalized over a total number of classes and a total number of examples.

Furthermore, an encoder decoder architecture based transformer, as aforementioned is trained on the multilabel classification model using the train and validation datasets. In addition to this, the prediction model is trained using the train and validation datasets. The predictive model is fitted for epochs in rage of 20 to 50, or with an early stopping on the validation dataset with a Hamming loss in range of $1e^{-2}$ to $1e^{-6}$.

Advantageously, the predictive model helps in accurate identification of targets, by generation the prediction score.

Advantageously, the trained predictive model and the trained multi-label deep learning neural network accurately and is efficiently generates the active and inactive targets for the given drug molecule, based on the generated prediction score.

Optionally, the processor is further configured execute the trained predictive model to identify at least one target similar to the targets classified as active targets. The trained predictive model enables the processor to identify the targets which similar or identical to the targets classified as the active targets.

Advantageously, the identification of the targets similar or identical to the targets classified as the active targets enables the processing and classification of large volume of target and drugs to identify the interactions among them. In addition to, it makes the system efficient and significantly less time consuming. Furthermore, it also enables the repurposing of the drug. This is primarily because a single drug might have the capability to interact, actively, with more than one target. Thus, a drug which was used for a target, now can be used for another target as well. This not only helps in repurposing the drug, but also helps in avoiding the unnecessary research and development costs of drug.

Optionally, the processor is further configured execute the trained predictive model to identify at least one anti-target. The given so drug might interact, actively, with the target for which it was not intended for and might produce the adverse reaction. The trained predictive model predicts the anti-targets for a given drug.

Optionally, the processor is further configured execute the trained predictive model to identify at least one active target with high is intrinsic activity. The various targets shows the various magnitude of intrinsic activity with the given drug, but not all of those targets might be suitable for the given drug to interact with. Thus, the trained predictive model identifies the active targets which shows relatively high intrinsic activity with the given drug.

In a second aspect, embodiments of the present disclosure provide a method for generating active and inactive targets for a given drug, wherein the generated active and inactive targets comprise entire target landscape for the given drug, wherein the method comprises:
  receiving the given drug as simplified molecular-input line-entry system (SMILES) notation strings;
  executing a pre-trained multi-label deep learning neural network to transform the SMILES notation strings into machine-readable embeddings in N-dimensional latent space;
  executing a pre-trained predictive model to process the machine-readable embeddings and generate a prediction score for each target; and
  generating the active and inactive targets for the given drug in response to the generated prediction score for each target.

Optionally, the at least one ontology database is at least one of a private database or a public database.

Optionally, the method comprises converting the plurality of input dataset of drug molecules into simplified molecular-input line-entry system (SMILES) notation strings.

Optionally, the multidimensional matrix comprises n*m dimensions, wherein the n dimension in the multidimensional matrix is number of columns representing count of targets, and wherein the m dimension in the multidimensional matrix is number of rows representing count of drug molecule of the input dataset.

Optionally, the method comprises imputing the at least one missing data in the multidimensional matrix by employing at least one similarity technique.

Optionally, the method comprises imputing the at least one missing data in the multidimensional matrix by calculating Tanimoto similarity based on the existing ontology of the drug molecules and associated targets thereof present in the plurality of the input dataset.

Optionally, the method comprises imputing the at least one missing data as active for given target present in the plurality of input dataset if the calculated Tanimoto similarity is greater than a threshold Tanimoto similarity.

Optionally, the machine-readable embeddings in N-dimensional latent space comprises drug molecule embeddings as known variable X and targets embeddings as unknown variable $Y_N$, and wherein N represents number of targets.

Optionally, the multi-label deep learning neural network is a Bidirectional Encoder Representations from Transformers model. Optionally, the method comprises classifying the target as active target when the prediction score for the target is greater than a threshold prediction score.

Optionally, then method comprises classifying the target is as inactive target when the prediction score for the target is smaller than the threshold prediction score.

The present disclosure also relates to the method as described above. Various embodiments and variants disclosed above apply mutatis mutandis to the method.

The present disclosure also relates to a non-transitory computer-readable medium, having stored thereon, computer-executable code, which when executed by a processor, causes the processor to generate active and inactive targets for a given drug, wherein the generated active and inactive targets comprise entire target landscape for the given drug, wherein the processor is configured to:
- receive the given drug as simplified molecular-input line-entry system (SMILES) notation strings;
- execute a pre-trained multi-label deep learning neural network to transform the SMILES notation strings into machine-readable embeddings in N-dimensional latent space;
- execute a pre-trained predictive model to process the machine-readable embeddings and generate a prediction score for each target; and
- generate the active and inactive targets for the given drug in response to the generated prediction score for each target.

DETAILED DESCRIPTION OF THE DRAWINGS

Figure 1:
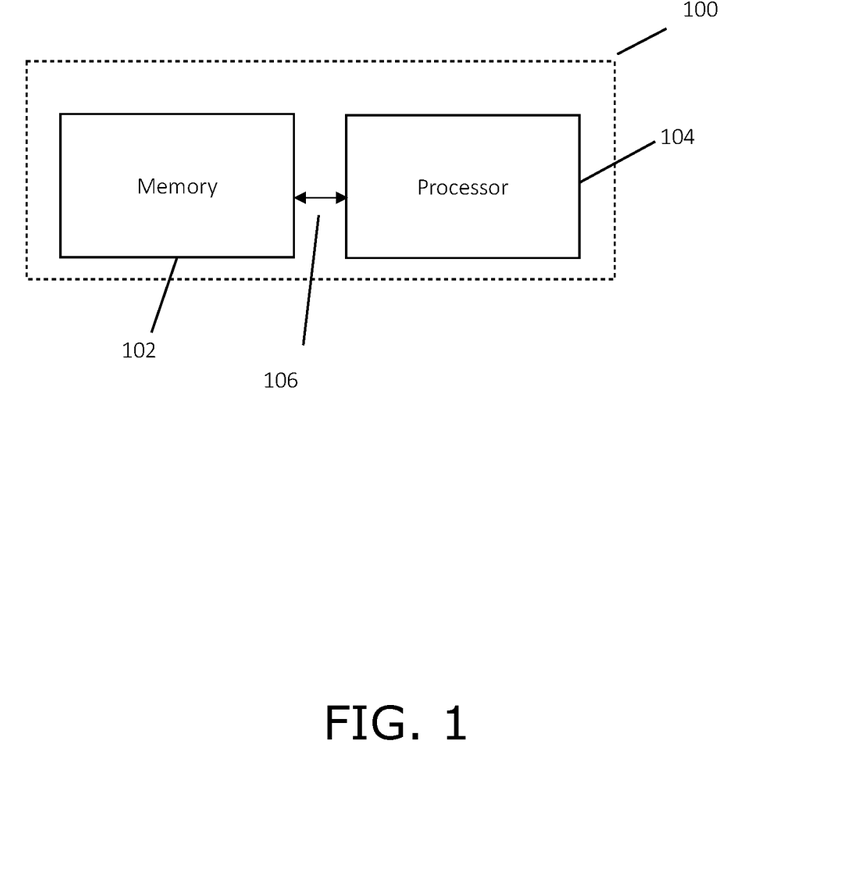
FIG. 1 is a schematic illustration of a block diagram of a system for generating active and inactive targets for a given drug, wherein the system comprises a processor communicably coupled to a memory, in accordance with an embodiment of the present disclosure.

Referring to FIG. 1, there is shown a schematic illustration of a block diagram of a system 100 for generating active and inactive targets for a given drug, wherein the generated active and inactive is targets comprise entire target landscape for the given drug, wherein the system 100 comprises a processor 104 communicably coupled to a memory 102 using a data communication network 106. The processor 104 is configured receive the given drug as simplified molecular-input line-entry system (SMILES) notation strings, execute a pre-trained multi-label deep learning neural network to transform the SMILES notation strings into machine-readable embeddings in N-dimensional latent space, execute a pre-trained predictive model to process the machine-readable embeddings and generate a prediction score for each target and generate the active and inactive targets for the given drug in response to the generated prediction score for each target.

Optionally, The processor 104 is configured to train a multi-label deep learning neural network and a predictive model by being configured to receive a plurality of input dataset of drug molecules and associated targets from an ontology database and convert the plurality of input dataset into a multidimensional matrix. The multidimensional matrix is enriched by imputing at least one missing data in the multidimensional matrix and execute the multi-label deep learning neural network to transform the multidimensional matrix into the machine-readable embeddings in N-dimensional latent so space. Furthermore, the predictive model is executed to process the machine-readable embeddings and generate a prediction score for the each associated target in the multidimensional matrix. The generated prediction score is then validated for each associated target using an existing ontology to conclude the training of the predictive model. The is trained multi-label deep learning neural network and the trained predictive model is then executed to, firstly, to identify targets by generating the prediction score and, secondly, to generate the active and inactive targets for the given drug molecule in response to the generated prediction score for each target.

Figure 2:
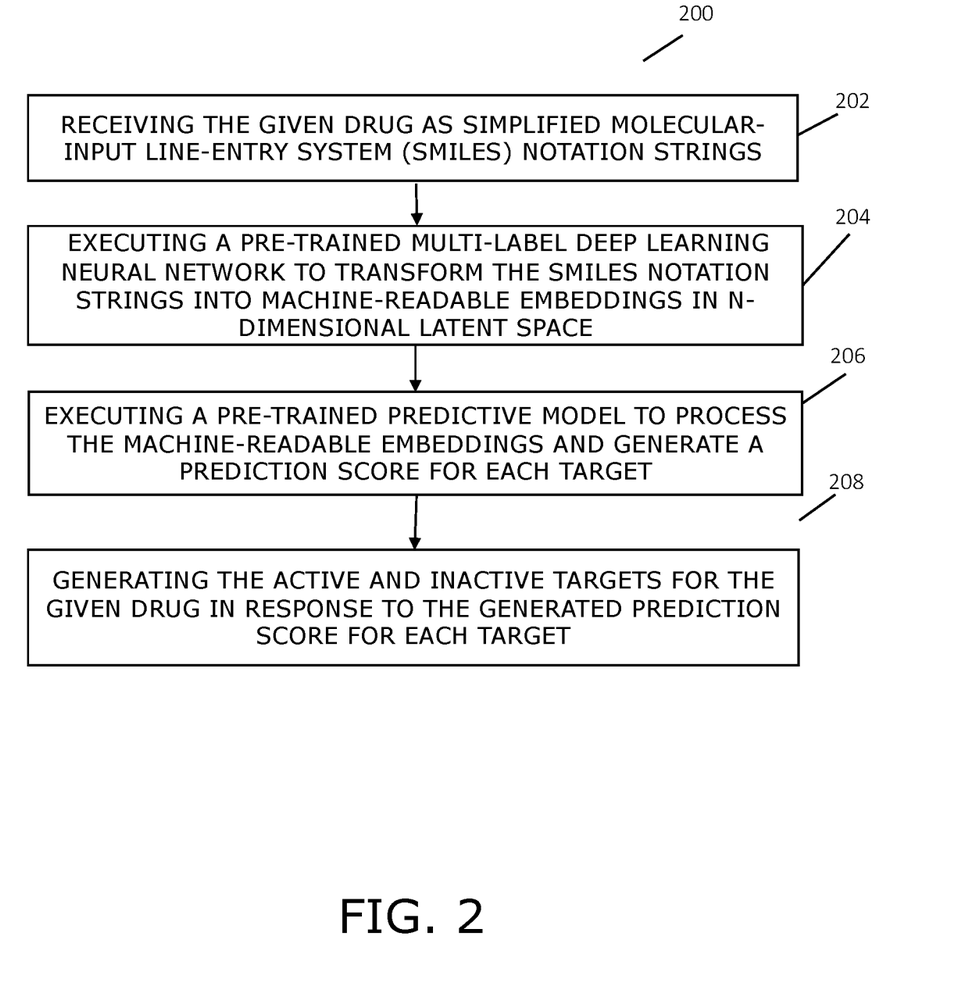
FIG. 2 is a schematic illustration of the steps of a method for generating active and inactive targets for a given drug, in accordance with an embodiment of the present disclosure.

Referring to FIG. 2, there is shown a schematic illustration of the steps of method 200 of generating active and inactive targets for a given drug, wherein the generated active and inactive targets comprise entire target landscape for the given drug, in accordance with an embodiment of the present disclosure. At step 202, the method comprises receiving the given drug as simplified molecular-input line-entry system (SMILES) notation strings, at step 204, executing a pre-trained multi-label deep learning neural network to transform the SMILES notation strings into machine-readable embeddings in N-dimensional latent space, at step 206, executing a pre-trained predictive model to process the machine-readable embeddings and generate a prediction score for each target, at step 208, generating the active and inactive targets for the given drug in response to the generated prediction score for each target.

The steps 202, 204, 206, and 208 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural where appropriate.

The invention claimed is:

1. A system for generating active and inactive targets for a given drug, wherein the generated active and inactive targets comprise entire target landscape for the given drug, wherein the system comprises a processor communicably coupled to a memory, wherein the processor is configured to:
   receive the given drug as simplified molecular-input line-entry system (SMILES) notation strings;
   execute a pre-trained multi-label deep learning neural network to transform the SMILES notation strings into machine-readable embeddings in N-dimensional latent space;
   execute a pre-trained predictive model to process the machine-readable embeddings and generate a prediction score for each target; and
   generate the active and inactive targets for the given drug in response to the generated prediction score for each target.

2. The system of claim 1, wherein the processor is configured to train the multi-label deep learning neural network and the predictive model, wherein, for the training of the multi-label deep learning neural network and the predictive model, the processor is further configured to:
   receive a plurality of input dataset of drug molecules and associated targets thereof from at least one ontology database;
   convert the plurality of input dataset into a multidimensional matrix;
   enrich the multidimensional matrix by imputing at least one missing data in the multidimensional matrix;
   execute the multi-label deep learning neural network to transform the multidimensional matrix into machine-readable embeddings in N-dimensional latent space;

execute the predictive model to process the machine-readable embeddings and generate a prediction score for each associated target in the multidimensional matrix;

validate the prediction score generated for each associated target using an existing ontology to conclude the training of the predictive model.

3. The system of claim 2, wherein the at least one ontology database is at least one of a private database or a public database.

4. The system of claim 2, wherein the processor is configured to convert the plurality of input dataset of drug molecules into simplified molecular-input line-entry system (SMILES) notation strings.

5. The system of claim 2, wherein the multidimensional matrix comprises n*m dimensions, wherein the n dimension in the multidimensional matrix is number of columns representing count of targets, and wherein the m dimension in the multidimensional matrix is number of rows representing count of drug molecule of the input dataset.

6. The system of claim 2, wherein the processor is further configured to impute the at least one missing data in the multidimensional matrix by employing at least one similarity technique.

7. The system of claim 6, wherein the processor is further configured to impute the at least one missing data in the multidimensional matrix by calculating Tanimoto similarity based on the existing ontology of the drug molecules and associated targets thereof present in the plurality of the input dataset.

8. The system of claim 7, wherein the processor is further configured to impute the at least one missing data as active for given target present in the plurality of input dataset if the calculated Tanimoto similarity is greater than a threshold Tanimoto similarity.

9. The system of claim 1, wherein the machine-readable embeddings in N-dimensional latent space comprises drug molecule embeddings as known variable X and targets embeddings as unknown variable $Y_N$, and wherein N represents number of targets.

10. The system of claim 1, wherein the multi-label deep learning neural network is a Bidirectional Encoder Representations from Transformers model.

11. The system of claim 1, wherein the processor is configured to is classify the target as active target when the prediction score for the target is greater than a threshold prediction score.

12. The system of claim 1, wherein the processor is configured to classify the target as inactive target when the prediction score for the target is smaller than the threshold prediction score.

13. The system of claim 1, wherein the processor is further configured to execute the trained predictive model to identify at least one target similar to the targets classified as active targets.

14. The system of claim 1, wherein the processor is further configured execute the trained predictive model to identify at least one antitarget.

15. The system of claim 1, wherein the processor is further configured execute the trained predictive model to identify at least one active target with high intrinsic activity.

16. A method for generating active and inactive targets for a given drug, wherein the generated active and inactive targets comprise entire target landscape for the given drug, wherein the method comprises:

receiving the given drug as simplified molecular-input line-entry system (SMILES) notation strings;

executing a pre-trained multi-label deep learning neural network to transform the SMILES notation strings into machine-readable embeddings in N-dimensional latent space;

executing a pre-trained predictive model to process the machine-readable embeddings and generate a prediction score for each target; and generating the active and inactive targets for the given drug in response to the generated prediction score for each target.

17. The method of claim 16, wherein the method comprises training the multi-label deep learning neural network and the predictive model by:

receiving a plurality of input dataset of drug molecules and associated targets thereof from at least one ontology database;

converting the plurality of input dataset into a multidimensional matrix;

enriching the multidimensional matrix by imputing at least one missing data in the multidimensional matrix;

executing the multi-label deep learning neural network to transform the multidimensional matrix into machine-readable embeddings in N-dimensional latent space;

executing the predictive model to process the machine-readable embeddings and generate a prediction score for each associated target in the multidimensional matrix;

validating the prediction score generated for each associated target using an existing ontology to conclude the training of the predictive model.

18. The method of claim 16, wherein the method comprises identifying at least one target similar to the targets classified as active targets.

19. The method of claim 16, wherein the method comprises identifying at least one antitarget.

20. The method of claim 16, wherein the method comprises identifying at least one active target with high intrinsic activity.

* * * * *